US012755191B2

(12) United States Patent
Yamanaka

(10) Patent No.: US 12,755,191 B2
(45) Date of Patent: Oct. 6, 2026

(54) TRAINING DEVICE TO LEARN DATA AND GENERATE A MODEL CALCULATING AN ANOMALY SCORE, TRAINING METHOD, AND TRAINING PROGRAM

(71) Applicant: NTT, Inc., Tokyo (JP)

(72) Inventor: Yuki Yamanaka, Musashino (JP)

(73) Assignee: NTT, Inc., Tokyo (JP)

( * ) Notice: Subject to any disclaimer, the term of this patent is extended or adjusted under 35 U.S.C. 154(b) by 686 days.

(21) Appl. No.: 18/026,605

(22) PCT Filed: Sep. 18, 2020

(86) PCT No.: PCT/JP2020/035623

§ 371 (c)(1),
(2) Date: Mar. 16, 2023

(87) PCT Pub. No.: WO2022/059208

PCT Pub. Date: Mar. 24, 2022

(65) Prior Publication Data

US 2023/0334361 A1 Oct. 19, 2023

(51) Int. Cl.
*G06N 20/00* (2019.01)

(52) U.S. Cl.
CPC .................................... *G06N 20/00* (2019.01)

(58) Field of Classification Search
CPC ...................................................... G06N 20/00
USPC ............................................................ 706/12
See application file for complete search history.

(56) References Cited

U.S. PATENT DOCUMENTS

| | | | | |
|---|---|---|---|---|
| 10,459,827 | B1 | 10/2019 | Aghdaie et al. | |
| 2016/0080404 | A1* | 3/2016 | Kohout | H04L 63/20 726/23 |
| 2017/0193380 | A1* | 7/2017 | Hara | G06N 7/01 |
| 2017/0279830 | A1* | 9/2017 | Mermoud | H04L 67/02 |
| 2017/0279834 | A1* | 9/2017 | Vasseur | H04L 41/147 |
| 2019/0095300 | A1* | 3/2019 | Oba | G05B 23/0281 |
| 2019/0190938 | A1* | 6/2019 | Oba | H04L 43/16 |
| 2021/0272704 | A1* | 9/2021 | Sudo | G06N 3/0442 |

FOREIGN PATENT DOCUMENTS

| | | | |
|---|---|---|---|
| CN | 110275506 | A | 9/2019 |
| CN | 110460458 | A | 11/2019 |
| EP | 3379360 | B1 | 11/2019 |
| JP | 2001-51969 | A | 2/2001 |
| JP | 2019-101982 | A | 6/2019 |
| JP | 2019-102011 | A | 6/2019 |
| JP | 2019-153893 | A | 9/2019 |

OTHER PUBLICATIONS

StackExchange.com, User: NaveganTeX (https://stats.stackexchange.com/users/246810/navegantex), “Cross Validation Vs Train Validation Test”, URL (version: May 26, 2019): https://stats.stackexchange.com/questions/410118, printed Mar. 19, 2024, 8 pages.

* cited by examiner

*Primary Examiner* — Leron Beck
(74) *Attorney, Agent, or Firm* — XSENSUS LLP

(57) ABSTRACT

A generation unit learns data selected as unlearned data among learning data and generates a model calculating an anomaly score. A selection unit selects, as unlearned data, at least some of data in which an anomaly score calculated by the model generated by the generation unit is equal to or greater than a threshold among the learning data.

13 Claims, 10 Drawing Sheets

TRAINING DEVICE TO LEARN DATA AND GENERATE A MODEL CALCULATING AN ANOMALY SCORE, TRAINING METHOD, AND TRAINING PROGRAM

CROSS-REFERENCE TO RELATED APPLICATION

The present application is based on PCT filing PCT/JP2020/035623, filed Sep. 18, 2020, the entire contents of which are incorporated herein by reference.

TECHNICAL FIELD

The present invention relates to a training device, a training method, and training program.

BACKGROUND ART

With the advent of the IoT era, a wide variety of devices are now being connected to the Internet for a wide variety of uses. In recent years, traffic session abnormality detection systems and intrusion detection systems (IDSs) for IoT devices have been actively studied as security countermeasures for IoT devices.

Some of such abnormality detection systems use probability density estimators based on unsupervised learning such as variational auto encoders (VAEs). An abnormality detection system using a probability density estimator can estimate the occurrence probability of a normal communication pattern by generating high dimensional data for learning called a traffic feature amount from actual communication and learning a feature of normal traffic using the feature amount. In the following description, the probability density estimator may be simply referred to as a model.

Thereafter, the abnormality detection system calculates an occurrence probability of each communication using a learned model and detects a communication with a small occurrence probability as an abnormality. Therefore, according to the abnormality detection system using the probability density estimator, there is the advantage that it is possible to detect an abnormality without knowing all the malicious states and it is also possible to handle an unknown cyber-attack. In the abnormality detection system, an anomaly score that is larger as the above-described occurrence probability is smaller may be used to detect an abnormality in some cases.

Here, the learning of the probability density estimator such as a VAE is often not successful in a situation where there is a bias in the number of pieces of normal data to be learned. In particular, in traffic session data, a situation in which there is a bias in the number of cases often occurs. For example, since HTTP communication is often used, a large amount of data is collected in a short time. On the other hand, it is difficult to collect a large amount of data of NTP communication or the like in which communication is rarely performed. When learning is performed by a probability density estimator such as a VAE in such a situation, learning of NTP communication with a small number of pieces of data is not successful, and an occurrence probability is estimated to be low, which may cause erroneous detection.

As a method of solving such a problem occurring due to a bias of the number of pieces of data, a method of performing learning of a probability density estimator in two stages is known (for example, see Patent Literature 1).

CITATION LIST

Patent Literature

Patent Literature 1: JP 2019-101982 A

SUMMARY OF INVENTION

Technical Problem

In the technology of the related art, however, there is a problem that a processing time increases in some cases. For example, in the method described in Patent Literature 1, since the learning of the probability density estimator is performed in two stages, a learning time is about twice as long as that in the case of one stage.

Solution to Problem

In order to solve the above-described problem and achieve the objective, a training device includes: a generation unit configured to learn data selected as unlearned data among learning data and generate a model calculating an anomaly score; and a selection unit configured to select, as the unlearned data, at least some of data in which an anomaly score calculated by the model generated by the generation unit is equal to or greater than a threshold among the learning data.

Advantageous Effects of Invention

According to the present invention, even when there is a bias in the number of pieces of normal data, learning can be accurately performed in a short time.

DESCRIPTION OF EMBODIMENTS

Hereinafter, embodiments of a training device, a training method, and a training program according to the present application will be described in detail with reference to the drawings. The present invention is not limited to the embodiments to be described below.

Configuration of First Embodiment

First, a flow of the learning process according to the present embodiment will be described with reference to FIG.

Figure 1:
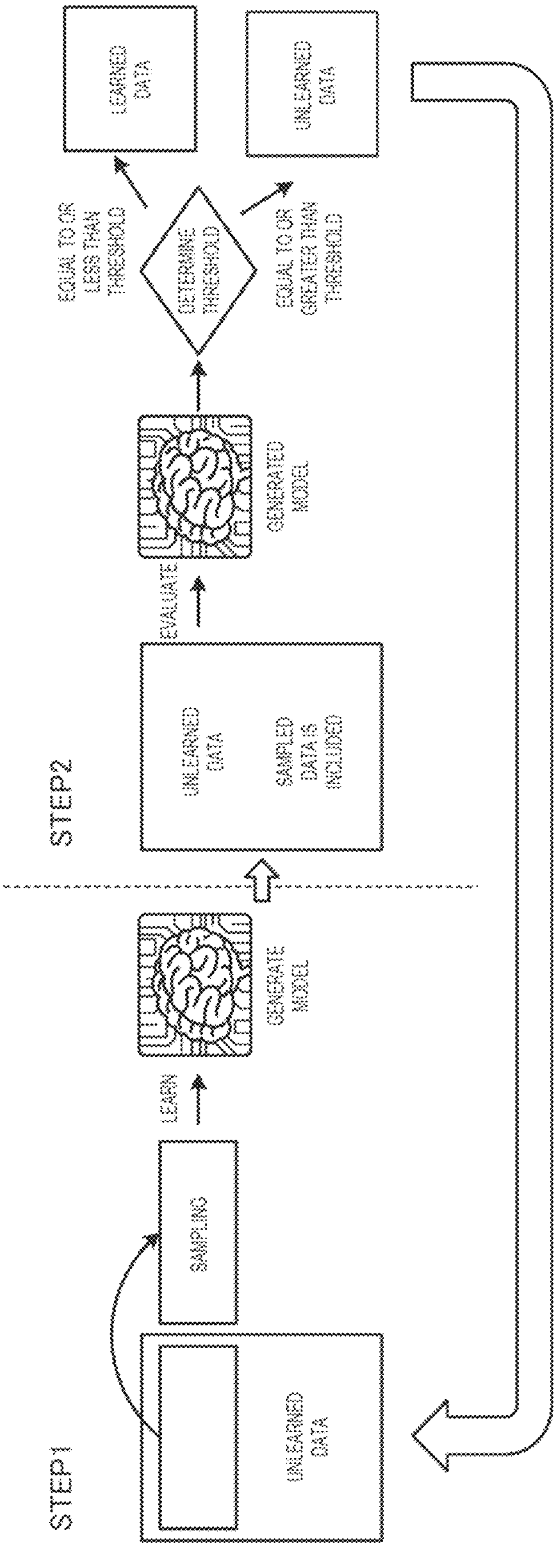
FIG. 1 is a diagram illustrating a flow of a learning process.

1. FIG. 1 is a diagram illustrating a flow of the learning processing. As illustrated in FIG. 1, the training device according to the present embodiment repeats STEP 1 and STEP 2 until an ending condition is satisfied. Accordingly, the training device generates a plurality of models. It is assumed that the generated models are added to a list.

First, it is assumed that collected learning data is all viewed as unlearned data. In STEP 1, the training device randomly samples a predetermined number of pieces of data from unlearned data. Then, the training device generates a model from the sampled data. For example, the model is a probability density estimator such as a VAE.

Subsequently, in STEP 2, the training device calculates an anomaly score of all the unlearned data using the generated model. Then, the training device selects data in which the anomaly score is equal to or less than a threshold as learned data. Conversely, the training device selects data in which an anomaly score is equal to or greater than the threshold as unlearned data. Here, when the ending condition is not satisfied, the training device returns to STEP 1.

In the second and subsequent STEP 1, data in which the anomaly score is equal to or greater than the threshold in STEP 2 is regarded as unlearned data. In this way, in the present embodiment, sampling and evaluation (calculation of the anomaly score and selection of the unlearned data) are repeated, and a dominant type of data among the unlearned data is sequentially learned.

In the present embodiment, since the data to be learned is reduced by performing sampling and narrowing down unlearned data, a time required for learning can be shortened.

Figure 2:
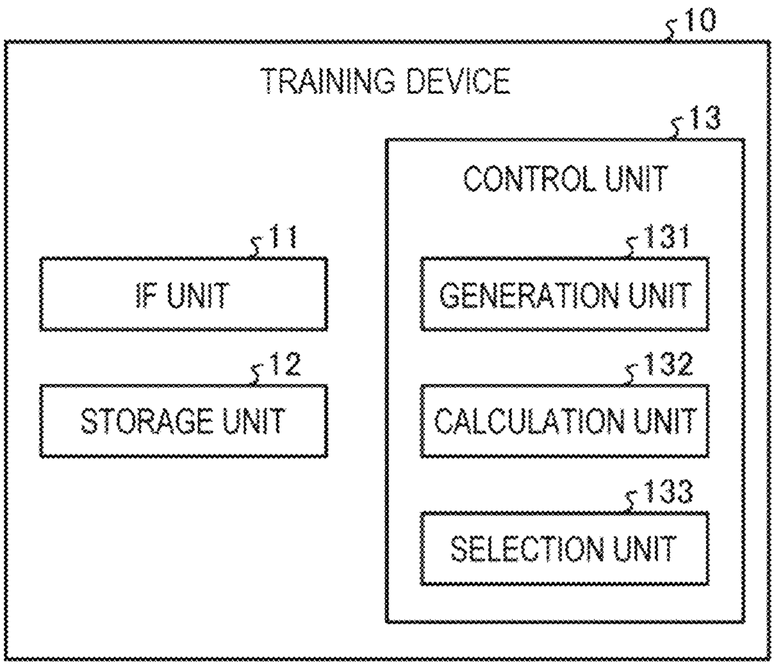
FIG. 2 is a diagram illustrating an exemplary configuration of a training device according to a first embodiment.

A configuration of the training device will be described. FIG. 2 is a diagram illustrating an exemplary configuration of the training device according to a first embodiment. As illustrated in FIG. 2, the training device 10 includes an interface (IF) unit 11, a storage unit 12, and a control unit 13.

The IF unit 11 is an interface that inputs and outputs data. For example, the IF unit 11 is a network interface card (NIC). The IF unit 11 may be connected to an input device such as a mouse or a keyboard and an output device such as a display.

The storage unit 12 is a storage device such as a hard disk drive (HDD), a solid state drive (SSD), or an optical disc. The storage unit 12 may be a semiconductor memory capable of rewriting data, such as a random access memory (RAM), a flash memory, or a nonvolatile static random access memory (NVSRAM). The storage unit 12 stores an operating system (OS) and various programs executed by the training device 10.

The control unit 13 controls the entire training device 10. The control unit 13 is, for example, an electronic circuit such as a central processing unit (CPU), a graphics processing unit (GPU), or a micro processing unit (MPU) or an integrated circuit such as an application specific integrated circuit (ASIC) or a field programmable gate array (FPGA). The control unit 13 includes an internal memory that stores programs and control data defining various processing procedures and performs each procedure using the internal memory. The control unit 13 functions as various processing units by causing various programs to operate. For example, the control unit 13 includes a generation unit 131, a calculation unit 132, and a selection unit 133.

The generation unit 131 learns data selected as unlearned data among learning data and generates a model calculating an anomaly score. The generation unit 131 adds the generated model to the list. The generation unit 131 can adopt a known VAE generation scheme. The generation unit 131 may generate a model based on data obtained by sampling some of the unlearned data.

The calculation unit 132 calculates an anomaly score of the unlearned data using the model generated by the generation unit 131. The calculation unit 132 may calculate an anomaly score of all the unlearned data or may calculate an anomaly score of some of the unlearned data.

The selection unit 133 selects, as unlearned data, at least some of the data in which the anomaly score calculated by the model generated by the generation unit 131 is equal to or greater than the threshold among the learning data.

Figure 3:
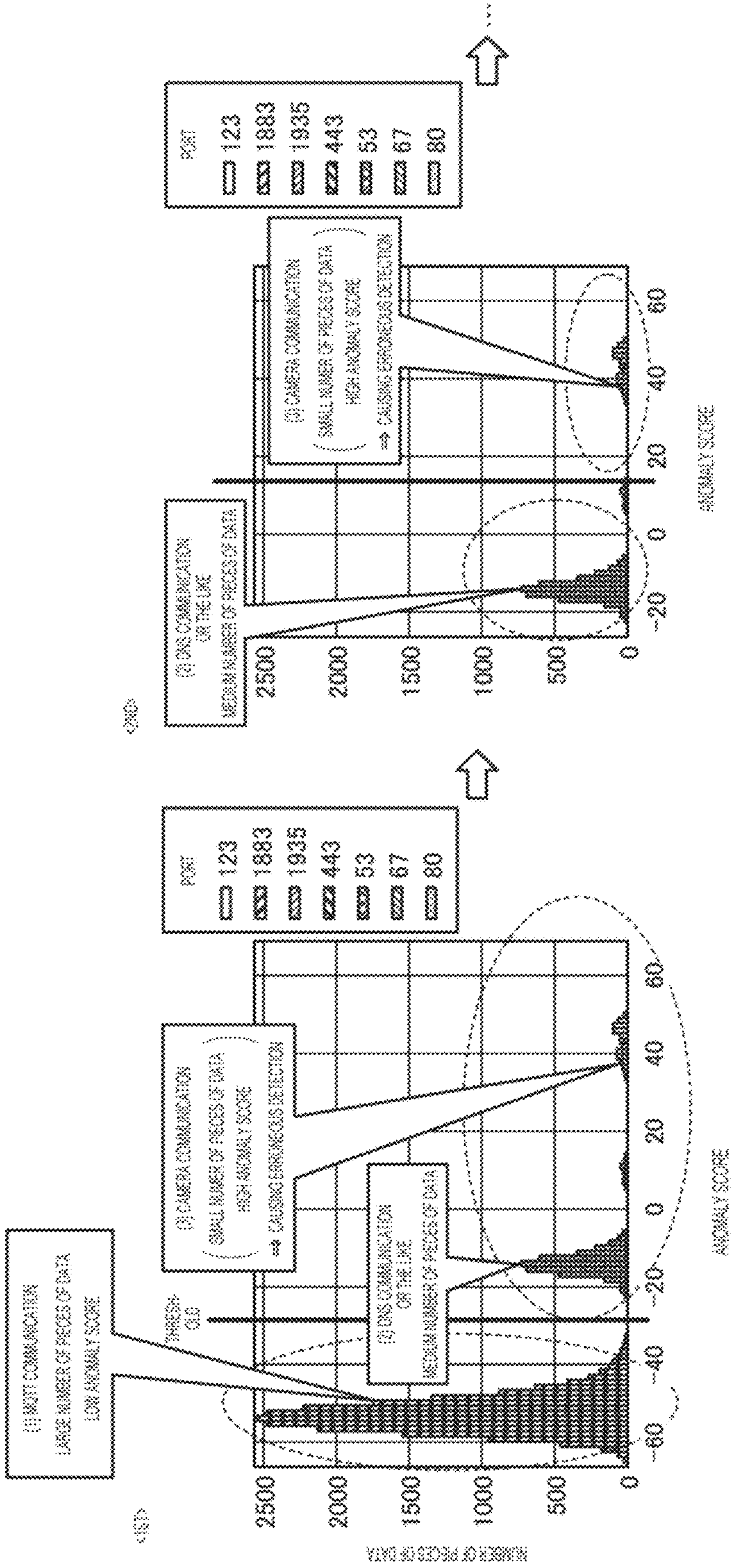
FIG. 3 is a diagram illustrating selection of unlearned data.

The selection of the unlearned data by the selection unit 133 will be described with reference to FIG. 3. FIG. 3 is a diagram illustrating selection of the unlearned data. Here, it is assumed that the model is VAE, and an anomaly score of communication data is calculated in order to detect abnormal communication.

As described above, erroneous detection often occurs under a situation where there is a deviation in the number of pieces of data. For example, when a large amount of HTTP communication and a small amount of FTP communication for management are simultaneously set as learning targets, a deviation in the number of pieces of data occurs.

As illustrated in <1st> of FIG. 3, here, a situation in which there are a large amount of data of MQTT communication, a medium amount of data of DNS communication or the like, and a small amount of data of camera communication is assumed. In the graph of FIG. 3, the horizontal axis represents an anomaly score that is an approximate value of the negative log likelihood (−log p (x)) of a probability density and the vertical axis represents a histogram of the number of pieces of data. Since the negative log likelihood of the probability density takes a higher value as the density (appearance frequency) of the data points is lower, the negative log likelihood can be regarded as an anomaly score, that is, the degree of abnormality.

As illustrated in <1st> of FIG. 3, the anomaly score of the MQTT communication with a large number of pieces of data is low, and the anomaly score of camera streaming communication with a small number of pieces of data is high. Therefore, it is conceivable that data of camera communication with a small number of pieces of data causes erroneous detection.

Accordingly, the selection unit 133 selects unlearned data from data in which an anomaly score is equal to or greater than the threshold. Then, a model in which erroneous detection is inhibited is generated using some or all of the selected unlearned data. In other words, the selection unit 133 has a function of excluding data that does not require further learning.

The threshold may be determined based on the loss value obtained in generation of the model. In this case, the selection unit 133 selects, as the unlearned data, at least some of the data in which the anomaly score calculated by the model generated by the generation unit 131 is equal to or larger than the threshold calculated based on the loss value of each piece of data obtained in the generation of the model, among the learning data. For example, the threshold may be calculated based on an average value or a variance, such as the average +0.3 $\sigma$ of the loss value.

As illustrated in <2nd> of FIG. 3, the selection unit 133 mainly selects the data of the DNS communication and the data of the camera communication based on the anomaly score calculated in <1st>. Conversely, the selection unit 133 rarely selects the data of the MQTT communication with a large number of pieces of data.

The training device 10 can repeat processing by each of the generation unit 131, the calculation unit 132, and the selection unit 133 the third and subsequent times. That is, every time data is selected as unlearned data by the selection unit 133, the generation unit 131 learns the selected data and generates a model for calculating an anomaly score. Then, whenever the model is generated by the generation unit 131, the selection unit 133 selects, as unlearned data, at least some of data in which an anomaly score calculated by the generated model is equal to or greater than the threshold.

The training device 10 may end the repetition at a time point at which the number of pieces of data in which the anomaly score is equal to or greater than the threshold becomes less than a predetermined value. In other words, when the number of pieces of data in which the anomaly score calculated by the model generated by the generation unit 131 is equal to or larger than the threshold among the learning data satisfies the predetermined condition, the selection unit 133 selects at least some of the data in which the anomaly score is equal to or larger than the threshold as the unlearned data.

For example, the training device 10 may repeat the processing until the number of pieces of data in which the anomaly score is equal to or greater than the threshold is less than 1% of the number of pieces of first collected learning data. Since the model is generated and added to the list every repetition, the training device 10 can output the plurality of models.

The plurality of models generated by the training device 10 are used to detect an abnormality in a detection device or the like. The abnormality detection in which the plurality of models are used may be performed according to the method described in Patent Literature 1. That is, the detection device can detect an abnormality using a merge value or a minimum value of the anomaly scores calculated by the plurality of models.

Processing of First Embodiment

Figure 4:
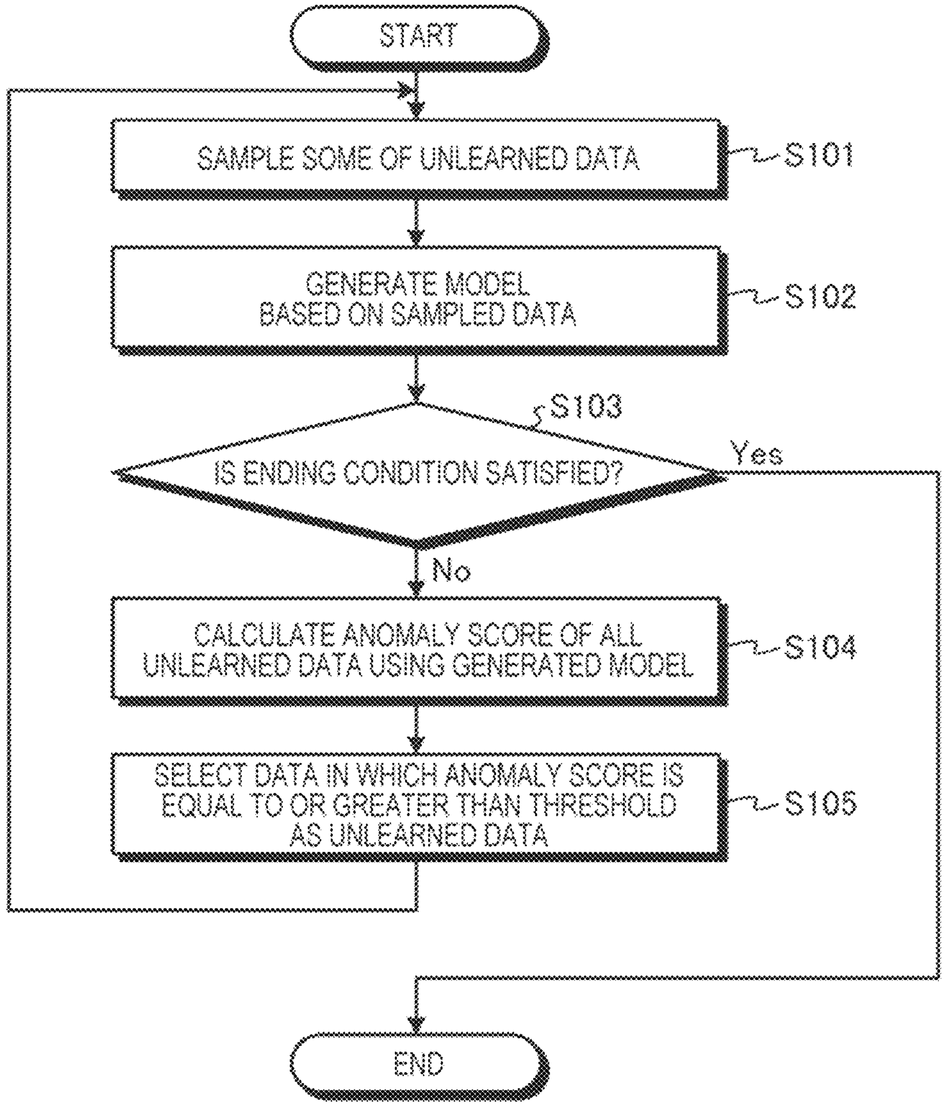
FIG. 4 is a flowchart illustrating a flow of processing of the training device according to the first embodiment.

FIG. 4 is a flowchart illustrating a flow of processing of the training device according to the first embodiment. First, the training device 10 samples some of the unlearned data (step S101). Next, the training device 10 generates the model based on the sampled data (step S102).

Here, when the ending condition is satisfied (Yes in step S103), the training device 10 ends the processing. Conversely, when the ending condition is not satisfied (No in step S103), the training device 10 calculates the anomaly score of all the unlearned data using the generated model (step S104).

The training device 10 selects the data in which an anomaly score is equal to or larger than a threshold as unlearned data (step S105), returns to step S101, and repeats the processing. The selection of the unlearned data is temporarily initialized immediately before step S105 is performed. That is, in step S105, the training device 10 newly selects the unlearned data with reference to the anomaly score in a state where a single piece of unlearned data has not been selected.

Advantageous Effects of First Embodiment

As described above, the generation unit 131 learns the data selected as unlearned data among the learning data and generates the model calculating an anomaly score. The selection unit 133 selects, as unlearned data, at least some of the data in which the anomaly score calculated by the model generated by the generation unit 131 is equal to or greater than the threshold among the learning data. In this way, after the model is generated, the training device 10 can select data that easily causes erroneous detection and generate the model again. As a result, according to the present embodiment, even when there is a bias in the number of pieces of normal data, the learning can be performed accurately in a short time.

Whenever the data is selected as the unlearned data by the selection unit 133, the generation unit 131 learns the selected data and generates the model calculating the anomaly score. Whenever the model is generated by the generation unit 131, the selection unit 133 selects, as the unlearned data, at least some of data in which an anomaly score calculated by the generated model is equal to or greater than the threshold. In the present embodiment, by repeating the processing in this way, the plurality of models can be generated and the accuracy of abnormality detection can be improved.

The selection unit 133 selects, as unlearned data, at least some of the data in which an anomaly score calculated by the model generated by the generation unit 131 is equal to or larger than the threshold calculated based on the loss value of each piece of data obtained in the generation of the model, among the learning data. Accordingly, it is possible to set the threshold according to the degree of bias of the anomaly score.

When the number of pieces of data in which the anomaly score calculated by the model generated by the generation unit 131 is equal to or larger than the threshold among the learning data satisfies a predetermined condition, the selection unit 133 selects at least some of the data in which the anomaly score is equal to or larger than the threshold as the unlearned data. By setting the ending condition of the repetitive processing in this way, it is possible to adjust a balance between the accuracy of the abnormality detection and the processing time required for the learning.

Experimental Result

Results of experiments carried out according to the present embodiment will be described. First, in the experiment, learning was performed using data for which the following communication is mixed:

- MQTT communication: 20951 in 1883 ports (large number of pieces of data)
- Camera communication: 204 in 1935 ports (small number of pieces of data)

Figure 5:
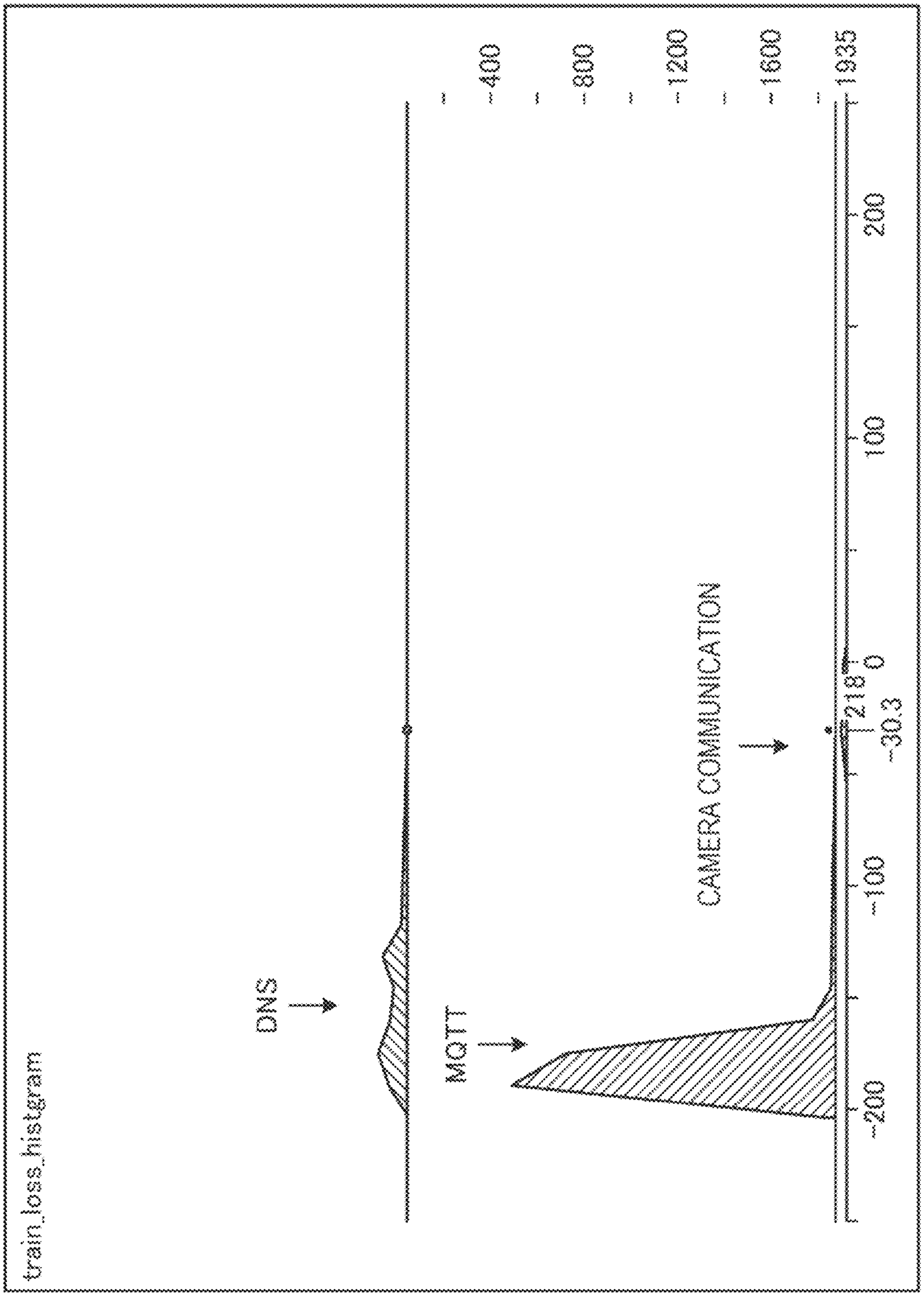
FIG. 5 is a diagram illustrating a distribution of an anomaly score.
Figure 6:
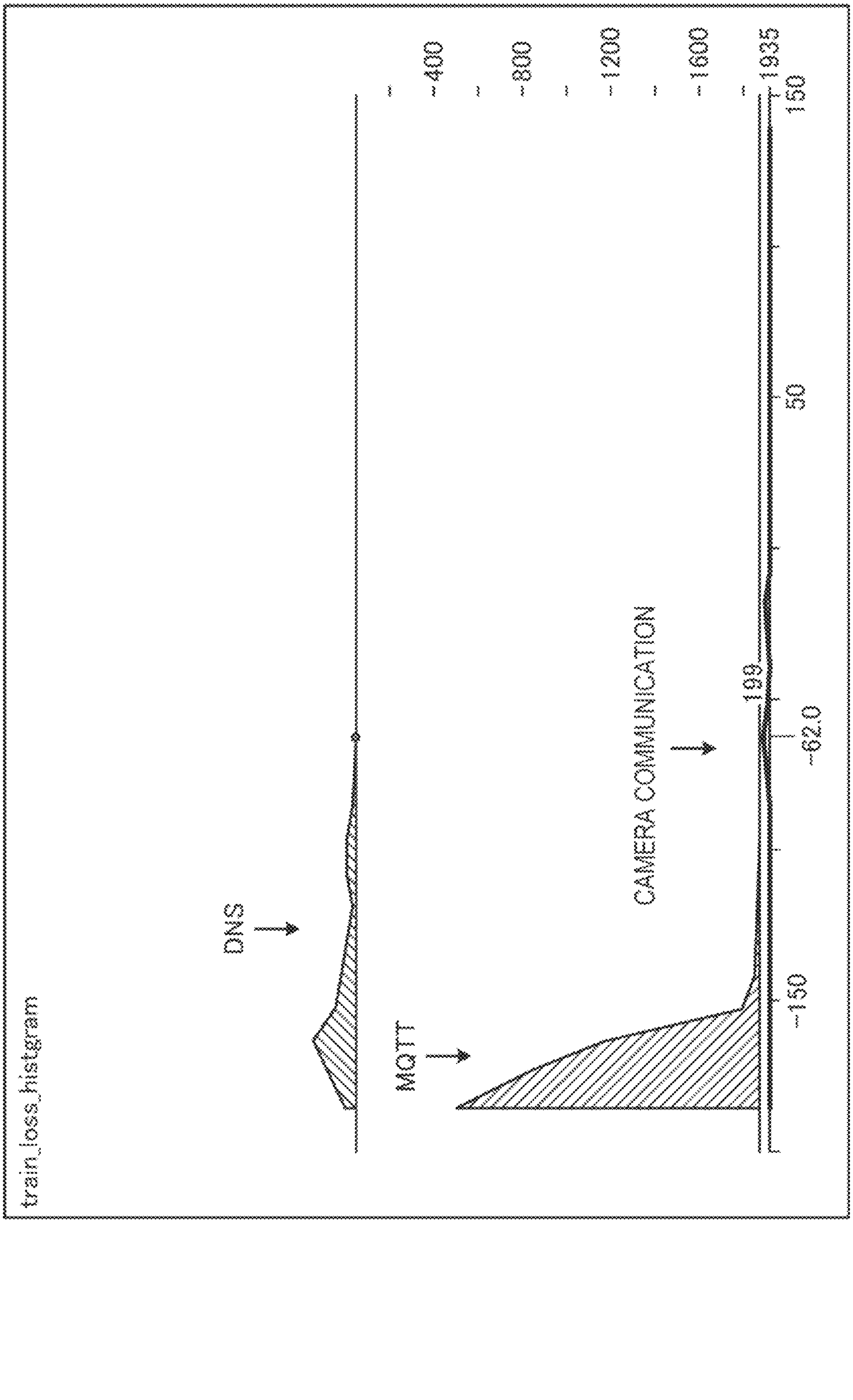
FIG. 6 is a diagram illustrating a distribution of an anomaly score.
Figure 7:
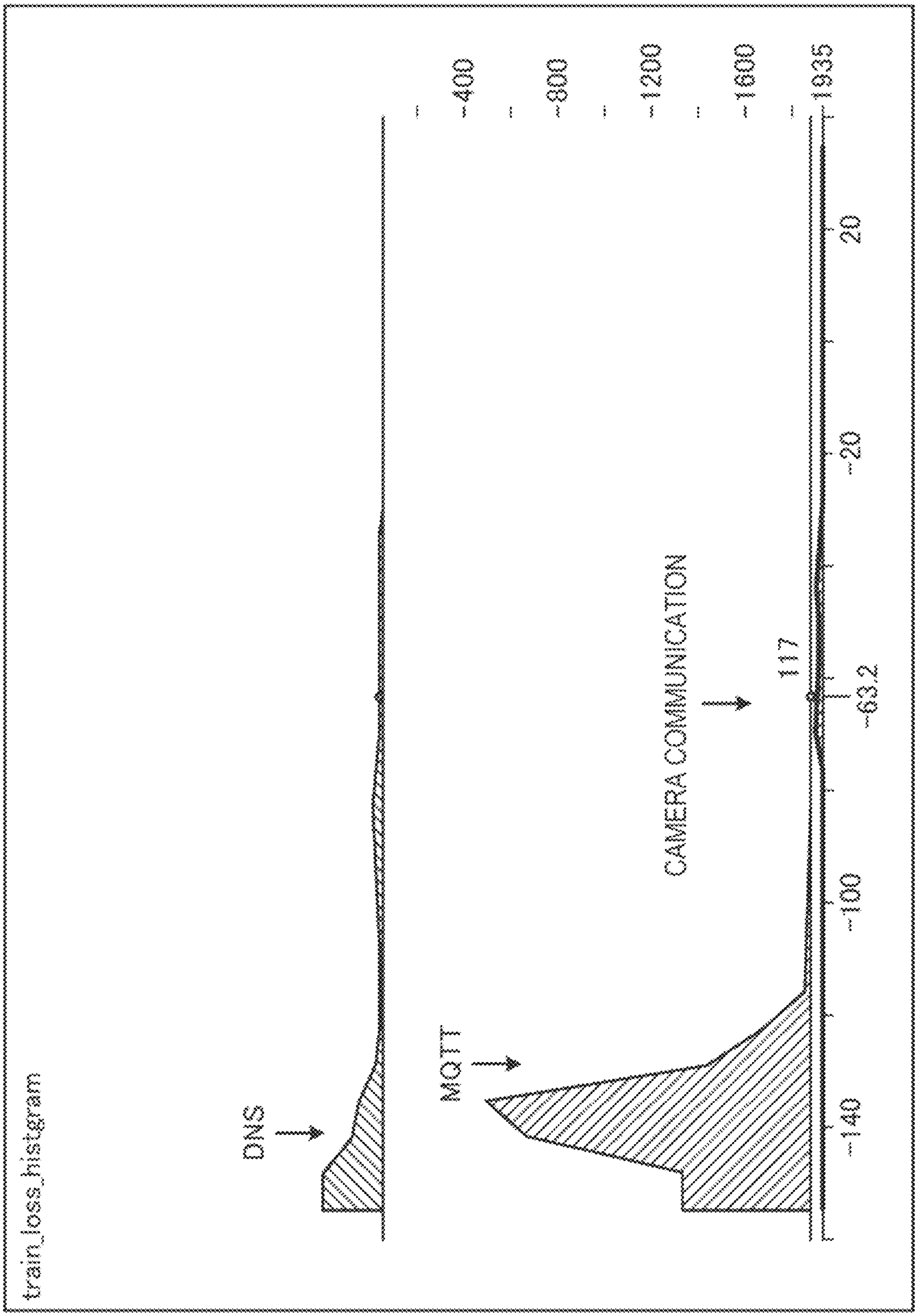
FIG. 7 is a diagram illustrating a distribution of an anomaly score.

In the experiment, a model was generated by the learning, and an anomaly score of each piece of data was calculated with the generated model. FIGS. 5, 6, and 7 are diagrams illustrating distributions of the anomaly scores.

First, a result of the learning by a VAE of the related art (one-stage VAE) is illustrated in FIG. 5. In the example of FIG. 5, a time required for learning was 268 sec. In the example of FIG. 5, the anomaly scores of the small number of pieces of data in the camera communication was calculated slightly higher.

FIG. 6 illustrates a result of learning by a two-stage VAE described in Patent Literature 1. In the example of FIG. 6, a time required for the learning was 572 sec. In the example of FIG. 6, the anomaly scores of the small number of pieces of data in the camera communication were lower than those in the example of FIG. 5.

FIG. 7 illustrates a result of learning according to the present embodiment. In the example of FIG. 7, a time required for learning was 192 sec. As illustrated in FIG. 7, in the present embodiment, the anomaly score of the camera communication is lowered to the same extent as that of the case of the two-stage VAE in FIG. 6, and the time required for the learning is significantly shortened.

Figure 8:
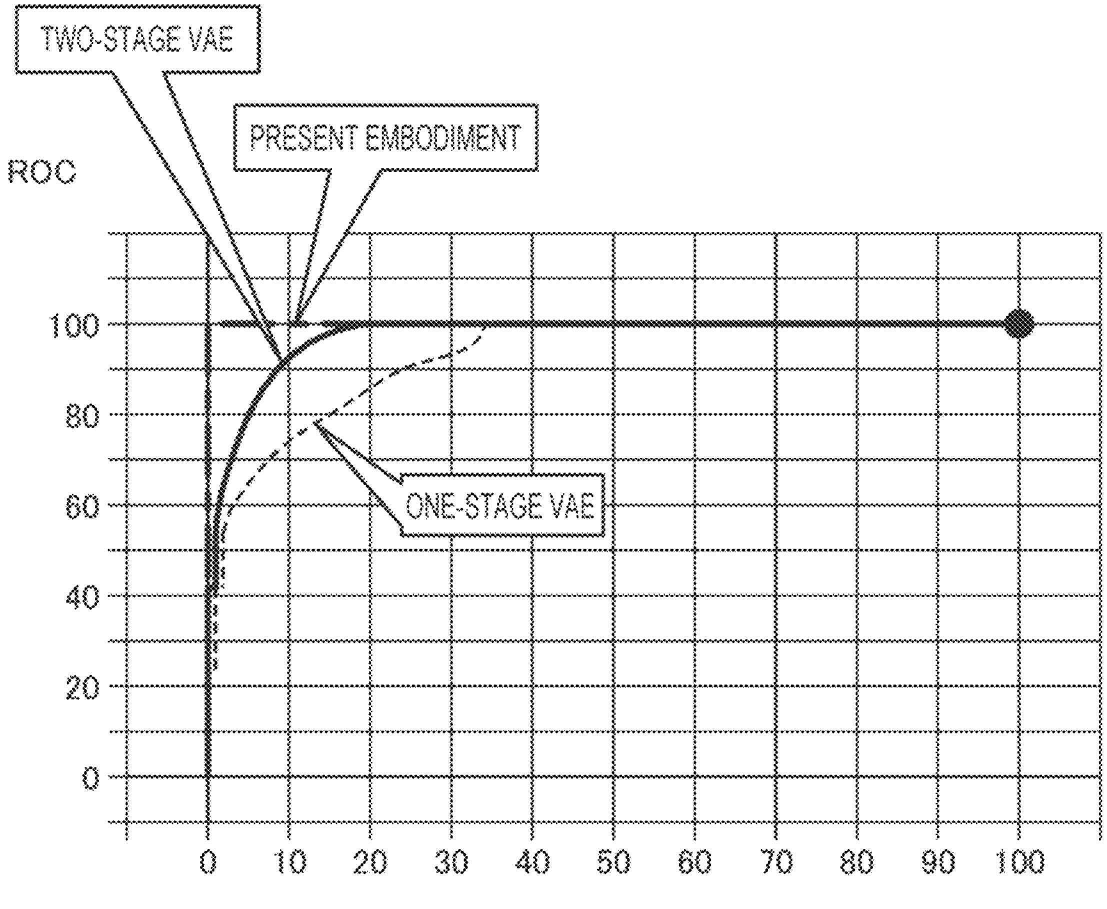
FIG. 8 is a diagram illustrating an ROC curve.

FIG. 8 is a diagram illustrating an ROC curve. As illustrated in FIG. 8, according to the present embodiment, an ideal ROC curve is illustrated, compared with the one-stage VAE and the two-stage VAE. The detection accuracy according to the present embodiment was 0.9949. The detection accuracy by the two-stage VAE was 0.9652. The detection accuracy by the one-step VAE was 0.9216. Thus, according to the present embodiment, the detection accuracy can be improved.

EXAMPLE

Figure 9:
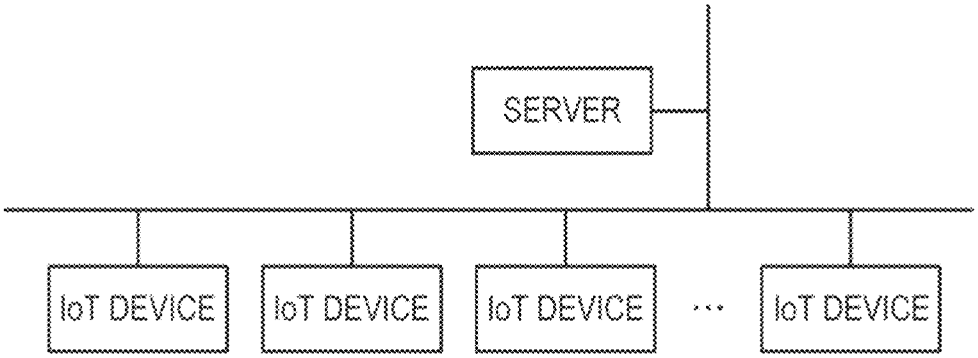
FIG. 9 is a diagram illustrating an exemplary configuration of an abnormality detection system.

As illustrated in FIG. 9, a server provided on a network to which IoT devices are connected may have the same model generation function as the training device 10 in the foregoing embodiment and an abnormality detection function using the model generated by the training device 10. FIG. 9 is a diagram illustrating an exemplary configuration of the abnormality detection system.

In this case, the server collects traffic session information transmitted and received by the IoT devices, learns a probability density of a normal traffic session, and detects an abnormal traffic session. The server applies the scheme of the embodiment at the time of learning the probability density of the normal traffic session and can generate the abnormality detection model with high accuracy and at high speed even when there is a deviation between the number of pieces of session data.

[System Configuration and the like]

Each constituent of the devices illustrated in the drawing is functionally conceptual and may not be physically configured as illustrated in the drawing. That is, a specific form of distribution and integration of each device is not limited to the illustrated form. Some or all of the constituents may be functionally or physically distributed and integrated in any unit according to various loads, usage conditions, and the like. Further, all or any part of each processing function performed in each device can be enabled by a central processing unit (CPU) and a program analyzed and executed by the CPU, or can be enabled as hardware by a wired logic. The program may be executed not only by the CPU but also by another processor such as a GPU.

Of the processes described in the present embodiments, some or all of the processes automatically performed, as described, may be manually performed, or some or all of pieces of the processes manually performed, as described may be automatically performed in accordance with a known method. In addition, the processing procedure, the control procedure, the specific names, and the information including various kinds of data and parameters illustrated in the documents and the drawings can be freely changed unless otherwise specified.

[Program]

In an embodiment, the training device 10 can be implemented by installing a training program that executes the foregoing learning process as packaged software or online software in a desired computer. For example, by causing an information processing device to execute the foregoing training program the information processing device can be caused to function as the training device 10. The information processing device mentioned here includes a desktop computer or a laptop computer. In addition to the computer, the information processing device also includes mobile communication terminals such as a smartphone, a mobile phone, and a personal handyphone system (PHS) and further includes a slate terminal such as a personal digital assistant (PDA).

Furthermore, when a terminal device used by a user is implemented as a client, the training device 10 can also be implemented as a learning server device that provides a service related to the processing to the client. For example, the learning server device is implemented as a server device that provides a learning service in which learning data is an input and information regarding a plurality of generated models is an output. In this case, the learning server device may be implemented as a web server or may be implemented as a cloud that provides a service related to the learning process by outsourcing.

Figure 10:
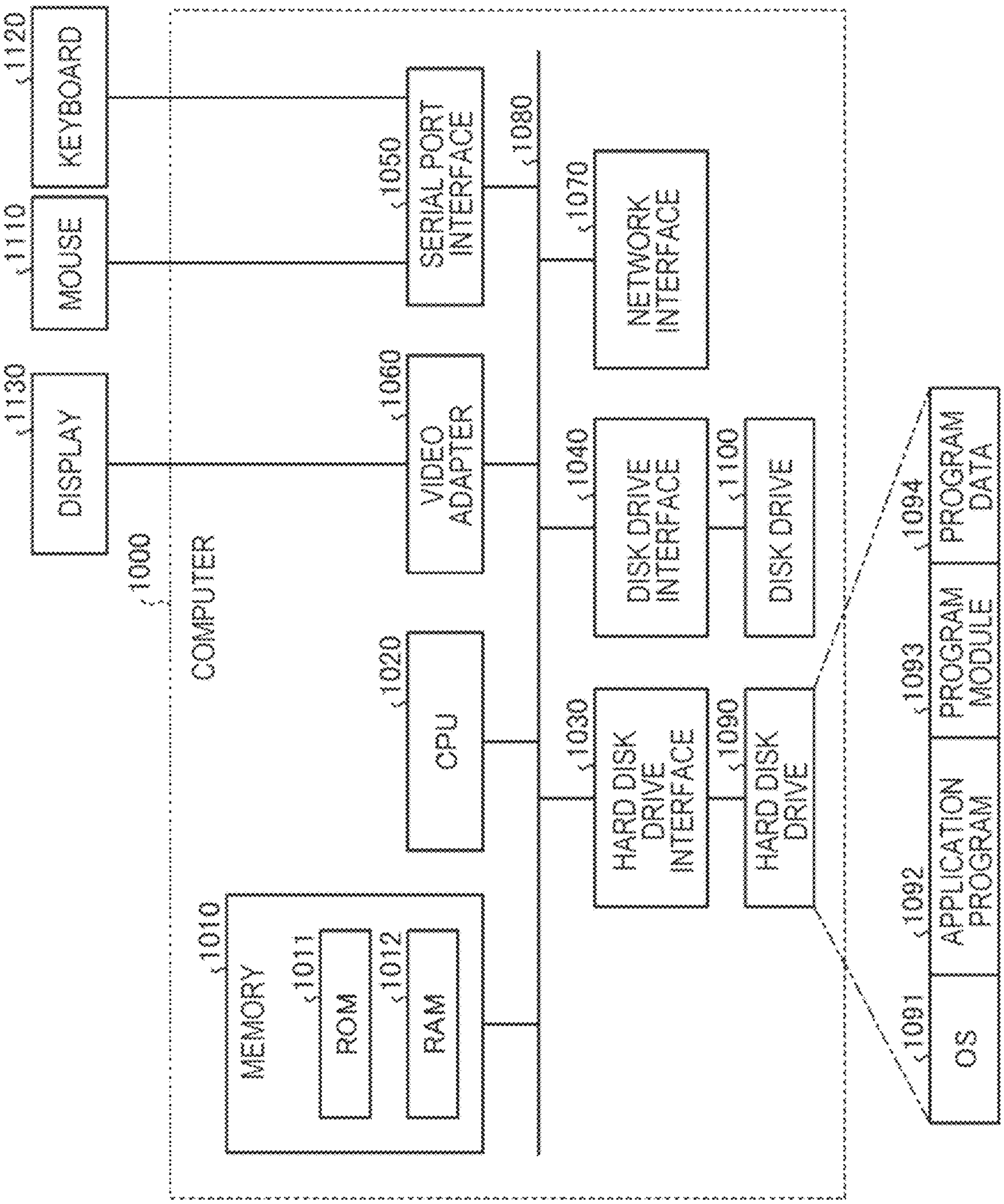
FIG. 10 is a diagram illustrating an example of a computer that executes a training program.

FIG. 10 is a diagram illustrating an example of a computer that executes the training program. A computer 1000 includes, for example, a memory 1010 and a CPU 1020. The computer 1000 also includes a hard disk drive interface 1030, a disk drive interface 1040, a serial port interface 1050, a video adapter 1060, and a network interface 1070. These units are connected to each other by a bus 1080.

The memory 1010 includes a read-only memory (ROM) 1011 and a random access memory (RAM) 1012. The ROM 1011 stores, for example, a boot program such as a basic input output system (BIOS). The hard disk drive interface 1030 is connected to a hard disk drive 1090. The disk drive interface 1040 is connected to a disk drive 1100. For example, a removable storage medium such as a magnetic disk or an optical disc is inserted into the disk drive 1100. The serial port interface 1050 is connected to, for example, a mouse 1110 and a keyboard 1120. The video adapter 1060 is connected to, for example, a display 1130.

The hard disk drive 1090 stores, for example, an OS 1091, an application program 1092, a program module 1093, and program data 1094. That is, the program that defines each processing of the training device 10 is implemented as the program module 1093 in which a code which can be executed by the computer is described. The program module 1093 is stored in, for example, the hard disk drive 1090. For example, the program module 1093 executing similar processing to the functional configurations in the training device 10 is stored in the hard disk drive 1090. The hard disk drive 1090 may be replaced with a solid state drive (SSD).

Setting data used in the processing of the above-described embodiments is stored as the program data 1094, for example, in the memory 1010 or the hard disk drive 1090. Then, the CPU 1020 reads, in the RAM 1012, the program module 1093 and the program data 1094 stored in the memory 1010 or the hard disk drive 1090, as needed, and executes the processing of the above-described embodiments.

The program module 1093 and the program data 1094 are not limited to the case in which the program module 1093 and the program data 1094 are stored in the hard disk drive 1090 and may be stored in, for example, a detachable storage medium and may be read by the CPU 1020 via the disk drive 1100 or the like. Alternatively, the program module 1093 and the program data 1094 may be stored in another computer connected via a network (a local area network (LAN), a wide area network (WAN), or the like). Then, the program module 1093 and the program data 1094 may be read by the CPU 1020 from another computer via the network interface 1070.

REFERENCE SIGNS LIST

10 Training device
11 IF unit

12 Storage unit
13 Control unit
131 Generation unit
132 Calculation unit
133 Selection unit

The invention claimed is:

1. A training device comprising:

processing circuitry configured to:

learn data selected as unlearned data among learning data and generate a model calculating an anomaly score, wherein the model is a Variational Auto Encoder (VAE) that is used to learn the data and is used for the calculating of the anomaly score; and select, as the unlearned data, at least some of data in which an anomaly score calculated by the model is equal to or greater than a threshold among the learning data, wherein the threshold is determined based on a loss value obtained in generation of the model, and the threshold is calculated based on an average or a variance of the loss value.

2. The training device according to claim 1, wherein, the processing circuitry is further configured to whenever the selecting selects the data as the unlearned data, learn the selected data and generate a model calculating the anomaly score, and whenever the generating generates the model, select, as the unlearned data, at least some of data in which an anomaly score calculated by the generated model is equal to or greater than a threshold.

3. The training device according to claim 1, wherein the processing circuitry is further configured to select, as the unlearned data, at least some of data in which the anomaly score calculated by the model is equal to or larger than the threshold among the learning data, wherein the threshold is an average +0.3 σ of the loss value.

4. The training device according to claim 1, wherein the processing circuitry is further configured to select, as the unlearned data, at least some of data in which the anomaly score calculated by the model is equal to or larger than the threshold among the learning data when a number of pieces of the learning data in which the anomaly score is equal to or larger than the threshold satisfies a predetermined condition.

5. A training method executed by a training device, the method comprising:

learning data selected as unlearned data among learning data and generating a model calculating an anomaly score, wherein the model is a Variational Auto Encoder (VAE) that is used to learn the data and is used for the calculating of the anomaly score; and selecting, as the unlearned data, at least some of data in which an anomaly score calculated by the model is equal to or greater than a threshold among the learning data, wherein the threshold is determined based on a loss value obtained in generation of the model, and the threshold is calculated based on an average or a variance of the loss value.

6. A non-transitory computer-readable recording medium storing therein a training program that causes a computer to execute a process comprising:

learning data selected as unlearned data among learning data and generating a model calculating an anomaly score, wherein the model is a Variational Auto Encoder (VAE) that is used to learn the data and is used for the calculating of the anomaly score; and selecting, as the unlearned data, at least some of data in which an anomaly score calculated by the model is equal to or greater than a threshold among the learning data, wherein the threshold is determined based on a loss value obtained in generation of the model, and the threshold is calculated based on an average or a variance of the loss value.

7. The training device according to claim 1, wherein, the processing circuitry is further configured to whenever the selecting selects the data as the unlearned data, learn the selected data and generate a model calculating the anomaly score.

8. The training method of claim 5, further comprising:

whenever the selecting selects the data as the unlearned data, learning the selected data and generating a model calculating the anomaly score; and whenever the generating generates the model, selecting, as the unlearned data, at least some of data in which an anomaly score calculated by the generated model is equal to or greater than a threshold.

9. The training method of claim 5, further comprising:

selecting, as the unlearned data, at least some of data in which the anomaly score calculated by the model is equal to or larger than the threshold calculated based on a loss value of each piece of data obtained at a time of generation of the model among the learning data.

10. The training method of claim 5, further comprising:

selecting, as the unlearned data, at least some of data in which the anomaly score calculated by the model is equal to or larger than the threshold among the learning data when a number of pieces of the learning data in which the anomaly score is equal to or larger than the threshold satisfies a predetermined condition.

11. The non-transitory computer-readable recording medium of claim 6, further comprising:

whenever the selecting selects the data as the unlearned data, learning the selected data and generating a model calculating the anomaly score; and whenever the generating generates the model, selecting, as the unlearned data, at least some of data in which an anomaly score calculated by the generated model is equal to or greater than a threshold.

12. The non-transitory computer-readable recording medium of claim 6, further comprising:

selecting, as the unlearned data, at least some of data in which the anomaly score calculated by the model is equal to or larger than the threshold calculated based on a loss value of each piece of data obtained at a time of generation of the model among the learning data.

13. The non-transitory computer-readable recording medium of claim 6, further comprising:

selecting, as the unlearned data, at least some of data in which the anomaly score calculated by the model is equal to or larger than the threshold among the learning data when a number of pieces of the learning data in which the anomaly score is equal to or larger than the threshold satisfies a predetermined condition.

* * * * *